United States Patent
Selix

(10) Patent No.: US 10,403,168 B1
(45) Date of Patent: Sep. 3, 2019

(54) SYSTEMS AND METHODS FOR IMPROVING CALL CENTER PERFORMANCE

(71) Applicant: UNITED SERVICES AUTOMOBILE ASSOCIATION (USAA), San Antonio, TX (US)

(72) Inventor: George Selix, Rising Sun, IN (US)

(73) Assignee: United States Automobile Association (USAA), San Antonio, TX (US)

( * ) Notice: Subject to any disclaimer, the term of this patent is extended or adjusted under 35 U.S.C. 154(b) by 257 days.

(21) Appl. No.: 15/440,029

(22) Filed: Feb. 23, 2017

Related U.S. Application Data

(60) Provisional application No. 62/301,351, filed on Feb. 29, 2016.

(51) Int. Cl.
*A63F 9/24* (2006.01)
*G09B 19/00* (2006.01)
*G09B 5/00* (2006.01)

(52) U.S. Cl.
CPC .............. *G09B 19/00* (2013.01); *G09B 5/00* (2013.01)

(58) Field of Classification Search
CPC ............ A63B 24/0062; A63B 24/0075; A63B 2024/0065; A63B 24/0084; A63B 71/0622; A63B 2024/0093; G09B 5/02; G09B 19/00
See application file for complete search history.

(56) References Cited

U.S. PATENT DOCUMENTS

| | | | |
|---|---|---|---|
| 5,757,644 A * | 5/1998 | Jorgensen | G09B 7/04 379/72 |
| 6,038,544 A * | 3/2000 | Machin | G06Q 10/063112 705/7.14 |
| 8,226,477 B1 * | 7/2012 | Machado | G06Q 10/105 273/108.1 |
| 8,498,403 B1 * | 7/2013 | Coughlan | H04M 3/5233 379/265.06 |
| 8,834,175 B1 * | 9/2014 | Daddi | G09B 7/02 434/322 |
| 2002/0184069 A1 * | 12/2002 | Kosiba | G06Q 10/04 705/7.38 |
| 2004/0165717 A1 * | 8/2004 | McIlwaine | G06Q 10/06398 379/265.06 |
| 2009/0035736 A1 * | 2/2009 | Wolpert | G09B 19/00 434/219 |
| 2014/0072115 A1 * | 3/2014 | Makagon | H04M 3/5183 379/265.09 |
| 2014/0211933 A1 * | 7/2014 | Vymenets | H04M 3/5183 379/265.06 |
| 2016/0189558 A1 * | 6/2016 | McGann | G09B 5/06 434/219 |
| 2016/0241713 A1 * | 8/2016 | Alm | H04M 3/5183 |
| 2016/0328986 A1 * | 11/2016 | Corpus | G09B 7/06 |

* cited by examiner

*Primary Examiner* — Steve Rowland
(74) *Attorney, Agent, or Firm* — Baker & Hostetler LLP

(57) ABSTRACT

Systems and methods improve call center performance. A system can include a motor training component and a communication training component. A composite training component can determine a composite accuracy based on both motor training and communication training. A method can train motor skills, communication skills, and develop a composite training metric reflecting at least performance with respect to these aspects.

20 Claims, 6 Drawing Sheets

SYSTEMS AND METHODS FOR IMPROVING CALL CENTER PERFORMANCE

CROSS-REFERENCE TO RELATED APPLICATIONS

This application claims the benefit of and priority to U.S. Provisional Patent Application No. 62/301,351, filed Feb. 29, 2016, the entirety of which is incorporated herein by reference.

TECHNICAL FIELD

The present disclosure generally relates to methods and systems for training customer service representatives and, more specifically, to systems and methods for automating second level tasks.

BACKGROUND

Training customer service representatives, particularly those working at a call center, may involve two distinct set of tasks: communication (e.g., conversations with customers) and psycho-motor (e.g., data entry/retrieval using information systems). In practice, customer service representatives may be expected to multitask, like communicating with a customer on a telephone call while navigating through an information system to enter and obtain information relevant to the customer's inquiry.

Different training methods may be employed to facilitate a customer service representative's learning of these two overlapping skills. For example, one training module focuses on the customer service representative obtaining both skills at the same time. As another example, another training module sequences the training so that the student learns a minimal amount of one skill (e.g., psycho-motor) before shifting to the other (e.g., communication). These training methods suffer from a number of possible drawbacks. For example, after completing either of these example training modules, the customer service representative is barely proficient at both communication and psycho-motor skills.

This type of training persists despite well-accepted education theory that people can automate responses to psycho-motor tasks, given enough practice. Automating responses to psycho-motor tasks may enable shifting of cognitive bandwidth from that psycho-motor tasks to another task. If training focuses first on the customer service representatives reaching high proficiency (as opposed to a minimum threshold), then the ability of customer service representatives to have higher quality conversations with customers while performing these psycho-motor tasks may improve.

A common example of this phenomenon is learning to drive a car. In the beginning, a new driver focuses all of his/her attention on the psycho-motor skills to keep the car between the white lines. The ability to carry on a typical conversation while learning how to drive is difficult at first, because most of the new driver's cognitive bandwidth is focused on the many psycho-motor tasks that make up car driving (e.g., keeping the car in its lane, maintaining a proper distance between the car and a car in front of it, checking traffic signs, maintaining speed, decelerating, accelerating, braking, turning, checking blind spots, using a turn indicator). Over time, new drivers automate psychomotor responses to driving, allowing them to reallocate cognitive bandwidth to other tasks (e.g., conversations, listening to audiobooks/music/podcasts, et cetera).

SUMMARY

In an embodiment a system, comprises a microphone for receiving sound from a trainee, a speaker for transmitting sound to the trainee, and a keyboard for receiving motor input from the trainee. The system also comprises a motor training component operatively coupled with the speaker and the keyboard. The motor training component causes playback of prerecorded training calls at a playback speed and the motor training component receives motor input from the keyboard. The motor training component analyzes the motor input from the keyboard to determine a trainee motor accuracy metric and the motor training component compares the trainee motor accuracy metric to an acceleration threshold. The motor training component accelerates the playback speed when the trainee motor accuracy metric exceeds the acceleration threshold when the playback speed is below a maximum playback speed. The motor training component increases a prerecorded training call complexity when the trainee motor accuracy metric exceeds the acceleration threshold at the maximum playback speed. The system also comprises a communication training component operatively coupled with the speaker and the microphone. The communication training component causes initiation of two-way training calls when the trainee motor accuracy metric exceeds a motor training threshold and the playback speed exceeds a maximum playback speed for a maximum prerecorded call complexity and the communication training component receives communication input from the microphone. The communication training component determines a trainee communication accuracy metric based on the communication input. The system also comprises a composite training component that determines a composite trainee accuracy metric based on the trainee motor accuracy metric and the trainee communication accuracy metric.

In an embodiment, a method can comprise providing a current prerecorded training call having a current call complexity to a user at a playback speed. The current prerecorded training call may be among one or more prerecorded training calls having respective call complexities. The method can also comprise receiving a motor input from a trainee based on the current prerecorded training call and analyzing the motor input from the trainee to determine a trainee motor accuracy metric. The method can further comprise comparing the trainee motor accuracy metric to an acceleration threshold and determining whether the trainee motor accuracy metric exceeds the acceleration threshold. If the motor accuracy metric exceeds the acceleration threshold, the method can also comprise comparing the playback speed to a maximum playback speed. If the playback speed is below a maximum playback speed, the method can also comprise accelerating the playback speed for a subsequent prerecorded training call of the one or more prerecorded training calls. If the playback speed meets a maximum playback speed, the method can also comprise comparing the current call complexity to a maximum call complexity. If the current call complexity is below a maximum call complexity, the method can also comprise increasing the call complexity of the subsequent prerecorded training call of the one or more prerecorded training calls. If the current call complexity meets a maximum call complexity, the method can also comprise providing a current two-way training call to the user.

In an embodiment, a system comprises a motor training component that causes playback of prerecorded training calls having respective call complexities at a playback speed. The motor training component receives motor input from a trainee and the motor training component analyzes the motor input from the trainee to determine a trainee motor accuracy metric. The motor training component compares the trainee motor accuracy metric to an acceleration threshold and the motor training component accelerates the playback speed when the trainee motor accuracy metric exceeds the acceleration threshold. The motor training component increases a prerecorded training call complexity when the trainee motor accuracy metric exceeds the acceleration threshold at a maximum playback speed. The system also comprises a communication training component that causes initiation of two-way training calls when the trainee motor accuracy metric exceeds a motor training threshold and the playback speed exceeds a maximum playback speed for a maximum prerecorded call complexity. The communication training component receives communication input from the trainee and the communication training component determines a trainee communication accuracy metric based on the communication input. The system also comprises a composite training component that determines a composite trainee accuracy metric based on the trainee motor accuracy metric and the trainee communication accuracy metric.

Additional and alternative aspects will be apparent on review of other portions of this disclosure.

BRIEF DESCRIPTION OF THE DRAWINGS

So that those having ordinary skill in the art, to which the present disclosure pertains, will more readily understand how to employ the novel system and methods of the present disclosure, certain illustrated embodiments thereof will be described in detail herein-below with reference to the drawings, wherein.

DETAILED DESCRIPTION

Figure 1:
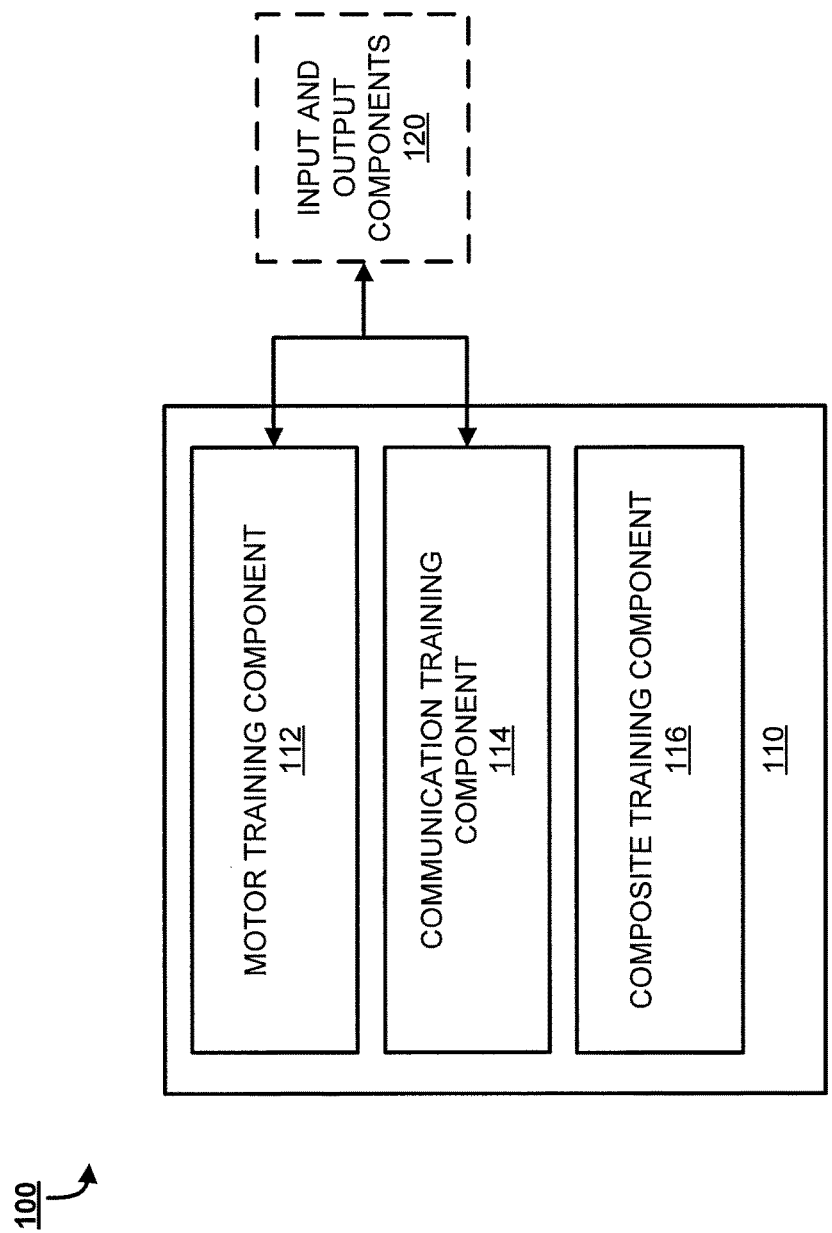
FIG. 1 illustrates a block diagram of an example system of the disclosure.

The subject disclosure generally concerns training, evaluating, and/or benchmarking call center capabilities. This can be accomplished through the combined evaluation of several proficiencies. Two such proficiencies include motor proficiencies (or psycho-motor proficiencies, indicating these proficiencies require active thought in conjunction with motor skills) and communication proficiencies (discussion or interaction such as voice interaction).

An example environment for such developments can include a call center staffed by call respondents who collect information. Training for such representatives typically simulates the entirety of the experience, providing all proficiencies at once as in a real-world environment. This sometimes results in ineffective training because the trainee is overwhelmed and cannot practice or improve proficiencies independent of one another.

Accordingly, aspects herein can allow for separate training of motor and communication skills to develop higher-proficiency representatives (or other personnel in different environments). In an embodiment following the call center example, motor skills can be trained first based on recorded tracks such that they are not distracted by engaging in communication during development of motor skills. As the trainee develops proficiency in the motor skills, cognitive capacity will be freed as the amount of focus required for proficient leveraging of motor skills is reduced. On reaching a baseline level of motor skills proficiency, communication proficiencies can be introduced for training without detracting from motor skills-based productivity or progression.

Proficiency and skills evaluation herein can also be used to benchmark, forecast, or otherwise conduct planning for one or more persons utilizing the relevant skills. While call centers and representatives working therein are described, it will be appreciated that the disclosures herein can be readily applied to other fields and proficiencies without departing from the scope or spirit of the innovation.

With respect to the call center example, calls can have a variety of characteristics. Calls can have complexity, which can relate to the difficulty of issues, number of issues, number of steps taken to handle an issue, et cetera. Call complexity can also be described in terms of linearity, which relates to whether the call remains on and proceeds through a single issue, or if the simulated, recorded, or live caller transitions abruptly between issues or topics, or portions of a single issue (e.g., goes back to previously-discussed aspect, responds to questions with unrelated questions). Calls can have a playback speed, which can be absolute or relative. The playback speed can be accelerated/increased or decelerated/decreased as described herein.

Calls can be prerecorded, particularly for motor training portions, such that they include all relevant communication and do not require interaction from a listener (e.g., trainee). In contrast, two-way training calls can be provided which do require interaction from a listener. Two-way training calls can be prerecorded but include breaks for response; can be prerecorded but await responses before next portions are played; be simulated for interaction; be provided live by a human or machine speaker; or provided in other manners. Two-way training calls can include one or more conversation paths, with simpler prerecorded two-way training calls proceeding according to a single conversation path, and simulated or live training calls including a plurality of paths which can branch or follow different possible conversational portions our outcomes.

Now referring to the drawings, wherein like reference numbers refer to like elements, FIG. 1 illustrates a system 100 having training subsystem 110 and, in embodiments, input and output components 120. Training subsystem 110 includes motor training component 112, communication training component 114, and composite training component 116.

Motor training component 112 may, in embodiments, be operatively coupled with input and output components 120. Input and output components 120 can include, e.g., a speaker, a keyboard, a mouse, a stylus, a display, a microphone, a touchscreen, et cetera, for purposes of conveying training materials and receiving input from a user or trainee.

Motor training component 112 causes playback of prerecorded training calls (or other materials) at a playback speed. Motor training component 112 receives motor input from a user or trainee and analyzes the motor input to determine a trainee motor accuracy metric. The trainee motor accuracy metric can be based on a variety of criteria, such as proper selection of an option in a software or on a machine based on the prerecorded training call, proper entry of information based on the prerecorded training call, speed of selection or entry, et cetera. In embodiments, these criteria are automatically scored by a machine and/or software thereon.

Motor training component 112 compares the trainee motor accuracy metric to an acceleration threshold and accelerates the playback speed when the trainee motor accuracy metric exceeds the acceleration threshold when the playback speed is below a maximum playback speed. Alternatively or complementarily, motor training component 112 increases a prerecorded training call complexity when the trainee motor accuracy metric exceeds the acceleration threshold at the maximum playback speed.

In further embodiments, motor training component 112 compares the trainee motor accuracy metric to an acceleration floor, and motor training component 112 decelerates the playback speed when the trainee motor accuracy metric is below the acceleration floor. In still further embodiments, motor training component 112 compares the trainee motor accuracy metric to an acceleration floor when the playback speed is at a minimum playback speed and in response the motor training component decreases the call complexity.

System 100 also includes communication training component 114 which may, in embodiments, be operatively coupled with input and output components 120.

Communication training component 114 causes initiation of two-way training calls when the trainee motor accuracy metric exceeds a motor training threshold and the playback speed exceeds a maximum playback speed for a maximum prerecorded call complexity.

Communication training component 114 receives communication input from a user or trainee and determines a trainee communication accuracy metric based on the communication input. The communication accuracy metric can be based on a variety of criteria, such as correctness of responses (e.g., based on call handling flow charts, based on information provided by prerecorded or live caller), speed of speech or typing, clarity of language, time to arrive at issue or conclusion, et cetera. In embodiments, these criteria are scored by a machine utilizing voice recognition, text analysis, and/or other techniques. In alternative or complementary embodiments, a human scorer may be involved in scoring the criteria used in generation of the trainee communication accuracy metric, and provides his or her score to a system which receives and utilizes the provided criteria scores.

In embodiments, one or both of motor training component 112 and communication training component can determine an initial trainee proficiency before causing playback of the prerecorded training calls. The initial trainee proficiency can relate to an initial playback speed or call complexity, or other variables which drive the prerecorded or live calls provided and the scoring for these calls.

Composite training component 116 determines a composite trainee accuracy metric based on the trainee motor accuracy metric and the trainee communication accuracy metric. This can be a value capturing both aspects to determine the trainee's overall capability in both motor and communication skills after both are trained.

In embodiments, system 100 can further comprise a metric aggregation component within training subsystem 110 or remote thereto. The metric aggregation component receives one or more additional composite trainee accuracy metrics and generates a group composite accuracy metric based on the composite trainee accuracy metric and the one or more additional composite trainee accuracy metrics. The group composite accuracy metric can capture the training status of a group or be used to evaluate or benchmark a group to determine their capabilities. For example, group composite accuracy metrics can allow an enterprise to determine particular call centers requiring additional training, or aid in forecasting staffing needs by providing a benchmark of effectiveness among particular groups of representatives.

While FIG. 1 and accompanying specification illustrate and describe particular embodiments for purposes of explanation, it is understood that alternatives can be pursued without departing from the scope or spirit of the disclosure. Not every aspect or detail provided need be practiced in all embodiments. Further, alternative systems and techniques can be used to similar effect as those described above.

Figure 2:
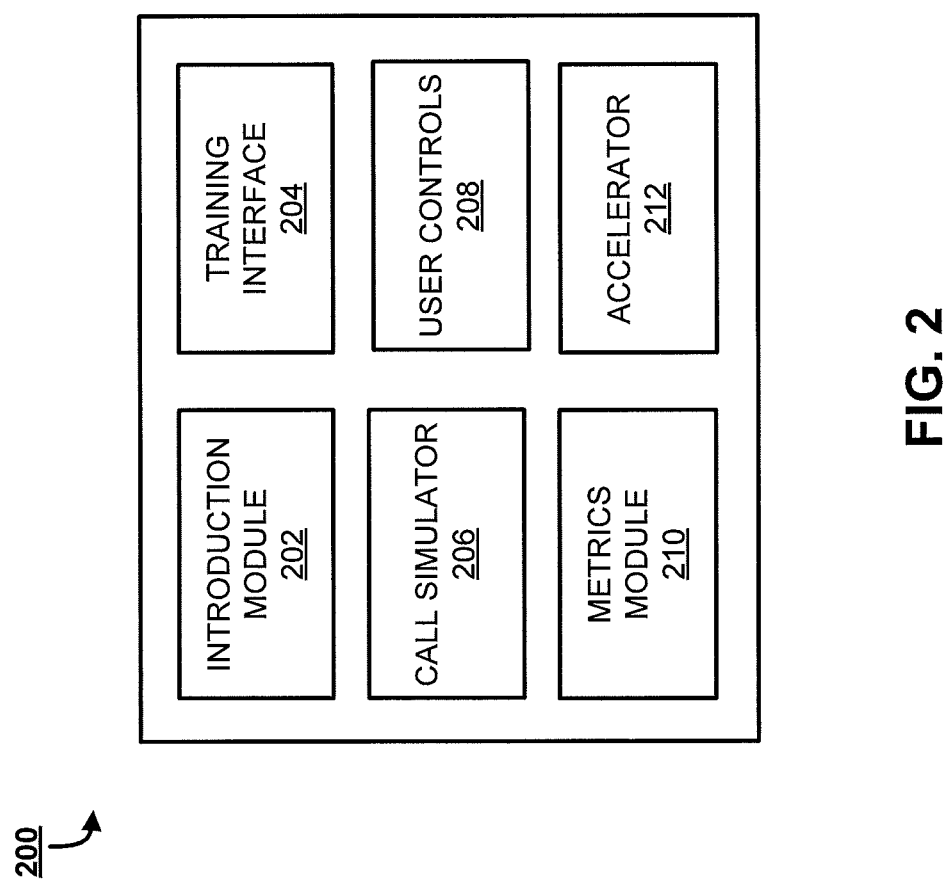
FIG. 2 is a block diagram of an example training module.

Describing one such alternative arrangement, FIG. 2 illustrates an example training module 200 in accordance with an aspect of the disclosure. As shown in FIG. 2, for example, training module 200 may provide a variety of modules through which a customer service representative may develop skills needed to perform both cognitive heavy (e.g., live communications) and psycho-motor (e.g., navigating a computer-based information system) tasks.

Training module 200 may comprise an introduction module 202 that provides an initial overview of systems and processes that may be used by the customer service representative being trained (e.g., "trainee") as part of his/her job requirements. This may include, for example, an overview of internal software used to collect data regarding customers. As another example, the introduction module 202 may provide an overview of the services/products that the trainee may discuss with or provide to customers. The introduction module 202 may provide an overview of the hardware/software that trainee may use as part of his/her job.

Introduction module 202 may provide an overview of each of the other modules of training module 200. Introduction module 202 may provide, for example, videos or other types of tutorials to provide a preview of the functionality of training module 200. This may include providing information regarding the user controls that trainee may use when walking through the different modules of training module 200.

A training interface 204 may be used to simulate calls or other activity to be used by the trainee to develop the psycho-motor and communication skills. Training interface 204 may provide graduated training that will get progressively harder as the trainee progresses through his/her training. The difficulty or complexity of the training stages of training interface 204 may or may not increase at a consistent rate, and may arbitrarily jump in complexity based on performance or other parameters.

Training module 200 may comprise a call simulator 206. Call simulator 206 may comprise recorded customer service calls that a trainee may use to practice retrieving and/or entering data. The recorded calls may be actual customer service calls with real members. Optionally, the calls may be scripted. The calls may comprise one or both sides of a conversation. For example, the calls may comprise only the speaking of the customer or the customer service representative. Or, the calls may comprise the complete conversation.

Calls of call simulator 206 may be categorized or ranked. These categories or rankings may be used to determine at what point in the training the call should be used. For example, basic calls addressing a single issue (e.g., a customer calling to update a mailing address) may be used for beginner-level training. Calls with higher numbers of issues to address (e.g., updating a mailing address, adding a new car to an insurance policy, and changing the payment method on file) may be categorized or ranked as more difficult than those with few numbers of issues.

Call simulator 206 may also rank calls based on linearity of the conversation. In real life, conversations are often nonlinear, such that new issues may be presented while the customer service representative is addressing a first issue. For example, while a customer service representative is adding new members to a policy, the customer service representative may become aware that an insurance claim needs to be filed. As another example, a customer service representative may be in the middle of filing a claim on an automobile accident when the customer seeks information regarding an auto loan to purchase a new car. In an aspect, these new issues may be addressed in the order they are presented (e.g., the customer service representative completes the automobile accident claim before discussing the auto loan), or they may address them in another order. These types of factors may affect the ranking of the call. Other factors that may affect the ranking of a call may include the call duration, complexity of the issues, clarity or directness of the customer, customer accents, or the like.

Training module 200 may comprise user controls 208 that allow a trainee to interact with training module 200. User controls may comprise input/output controls for locating, entering, and retrieving data through training interface 204. User controls 208 may optionally allow for trainee to control training module 200. For example, in an aspect, user controls 208 may provide for the trainee to pause, rewind, fast forward, or replay calls of call simulator 206. The availability of these controls may vary depending on the proficiency level of the trainee. For example, at the beginning stages, the trainee may have unlimited control to manipulate the playback of the call. As the difficulty progresses, or as the trainee proficiency increases, this functionality may no longer be available to the trainee.

Training module 200 may comprise a metrics module 210 that may be used to measure or track trainee's performance or proficiency. Training interface 204 may use data from metrics module 210 to select which training sessions to present to the trainee. For example, as metrics module 210 indicates that the trainee has mastered a beginner stage, training interface 204 may present moderately difficult calls to the trainee.

Training module 200 may comprise an accelerator 212 that may control or adjust the speed of calls from call simulator 206. As a trainee reaches a desired proficiency level for a certain category of calls, accelerator 212 may speed up that category of calls. Then, metrics module 210 may monitor the proficiency of the trainee until it reaches a desired threshold. For example, a desired threshold may require that a trainee reach 95% accuracy for calls played at 1.25× speed.

Once metrics module 210 indicates that the trainee has proficiency as the desired threshold, the call category may change to use more difficult calls. Once proficiency is achieved for at least one of the call categories at the 1.25× speed, then conversational skills may be added. For example, this may include using real calls where trainee interacts with a real or simulated customer while performing the psycho-motor skills developed.

Figure 3:
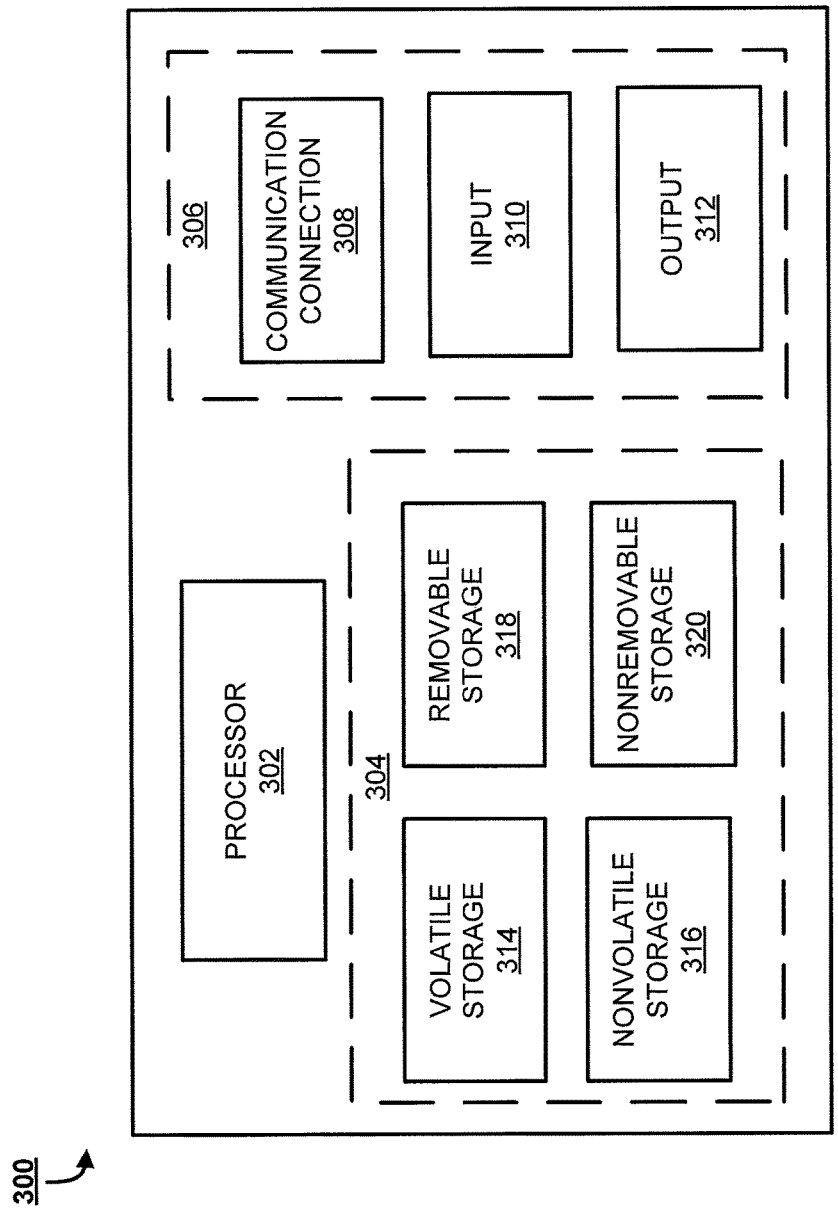
FIG. 3 is a block diagram illustrating an example implementation of a device through which the training module may be accessed.

Device 300 may comprise all or a part of modules or components herein. Device 300 may comprise hardware or a combination of hardware and software. The functionality to facilitate telecommunications via a telecommunications network may reside in one or combinations of portals or connections. Device 300 depicted in FIG. 3 may represent or perform functionality of an appropriate device 300, or combination of modules or components herein, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is example and not intended to imply a limitation to a specific implementation or configuration. Thus, device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of device 300, determining a type of broadcast message and acting according to the broadcast message type or content, as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations to map signal strengths in an area of interest.

Figure 4:
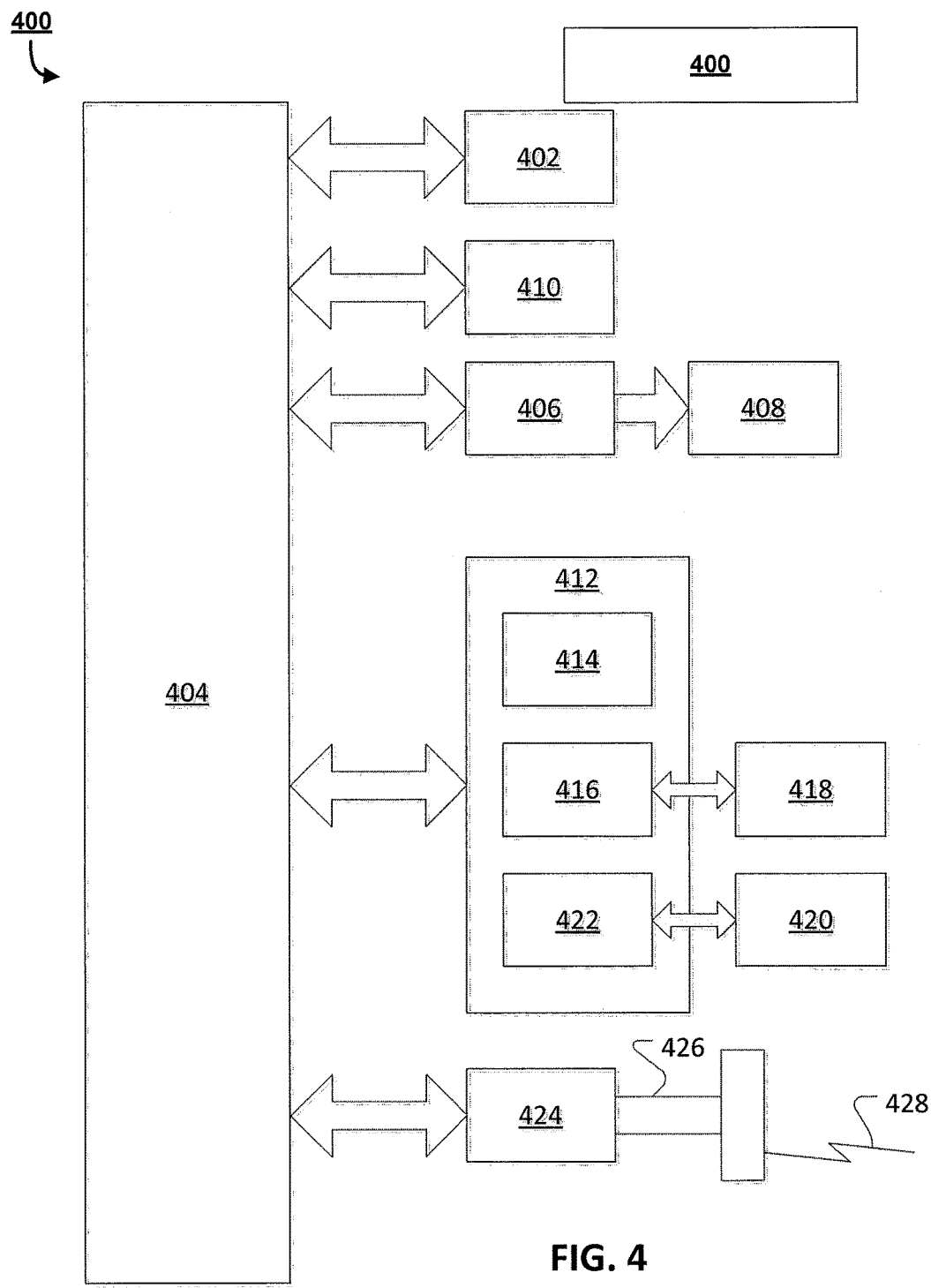
FIG. 4 is an block diagram of a computer system that be used to implement at least a portion of the integrated customer portal.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network-based portal.

Figure 5:
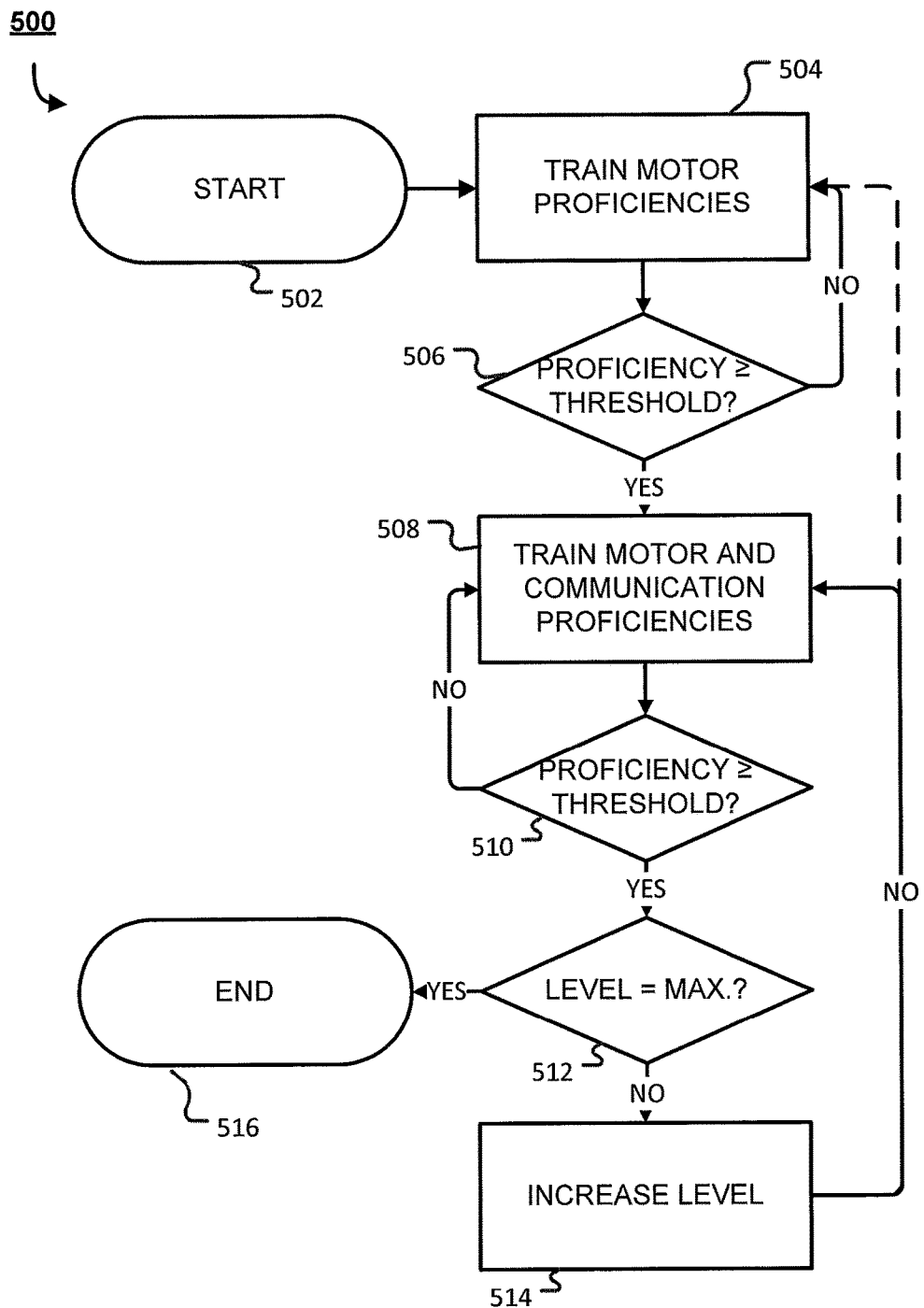
FIG. 5 is a flow chart of an example method in accordance with the disclosure.

FIG. 5 illustrates a flow chart of an example methodology 500 for training a user. Methodology 500 begins at 502 and proceeds to 504 where motor proficiency training is provided. Motor proficiency training can include aspects described herein which relate to developing a user or trainee's proficiency with software and interfaces without introducing communication proficiencies.

At 506, a determination is made as to whether the proficiency during motor training exceeds a threshold. The threshold can be based on a single level of performance or require various iterations of motor training at different complexities and speeds. If the determination at 506 returns negative, methodology 500 recycles to 504 where motor proficiency training continues. However, if the determination at 506 returns positive, methodology 500 proceeds to 508.

At 508, motor and communication proficiencies are trained. This can include the motor training as provided above but utilizes two-way training calls (or other communications) such that the user must actively communicate (e.g., speak, type, et cetera) throughout the process. In particular embodiments, communication proficiencies can be trained separately (e.g., train only communication proficiencies) at 508.

At 510, a determination is made as to whether the trainee proficiency exceeds a threshold for one or both of motor and communication training. If not, methodology 500 returns to 508 where training continues. If so, methodology 500 proceeds to 512

At 512, a determination is made as to whether the training is at a maximum level. The training "level" can refer to speed, complexity, issues involved, or other variables. The maximum level can be an absolute maximum or a final prescribed level for a particular training evolution that is less than the absolute maximum or most difficult training. If the determination at 512 returns negative, methodology 500 can proceed to 514 where the level is increased and then recycle to 508, or optionally 504, to continue training at the increased level. If the determination at 512 returns positive, methodology 500 can proceed to end at 516.

Figure 6:
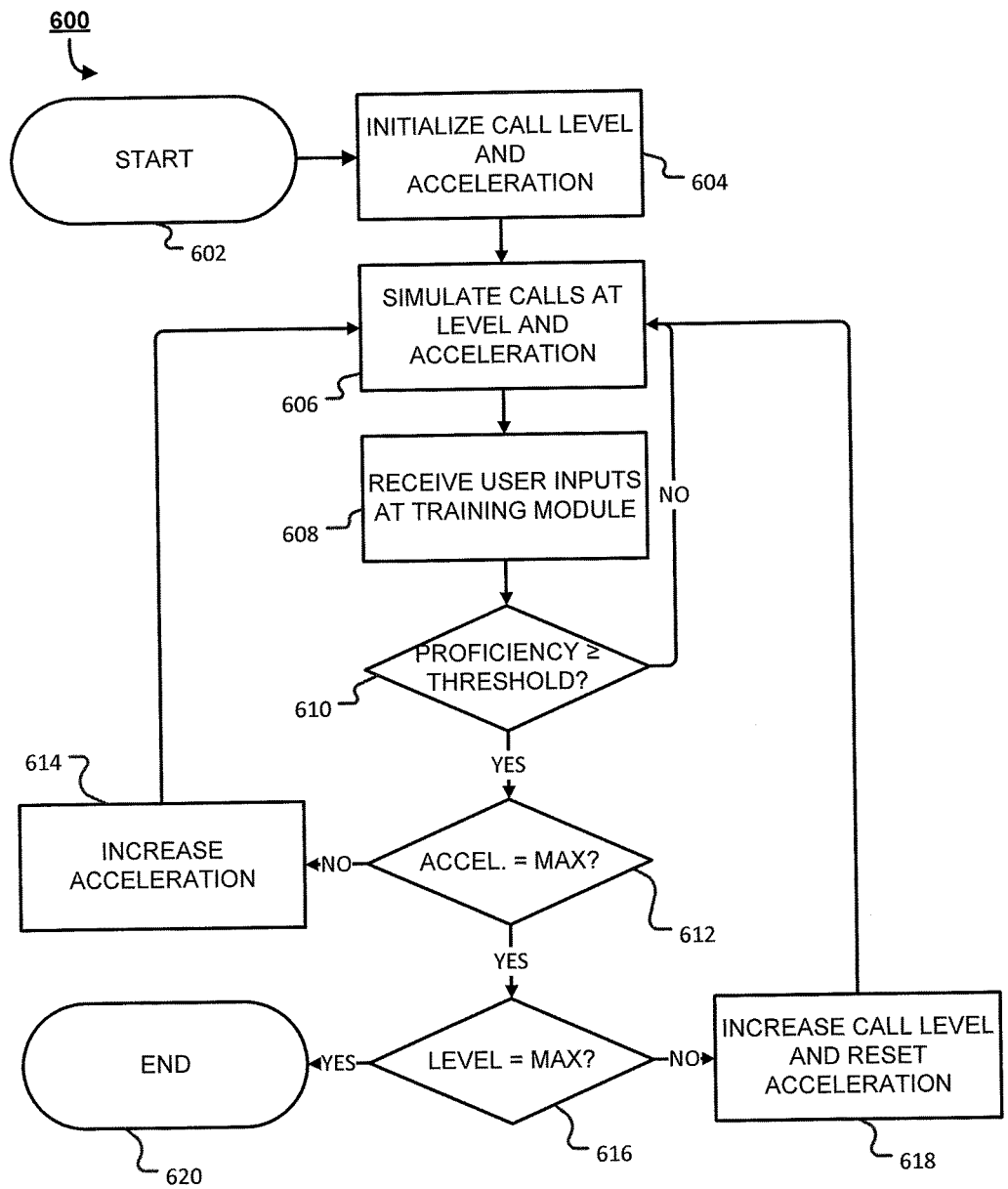
FIG. 6 is a flow chart of an example method for training customer service representatives.

FIG. 6 illustrates a flowchart of an alternative example methodology 600 for operating training system or module (e.g., as in FIGS. 1 and 2). Methodology 600 begins at 602 and proceeds to, for example, 604 where the training module initializes the call level and the acceleration level. In embodiments, initialization can include determining a user proficiency (e.g., motor, communication, or composite). In alternative embodiments, a benchmarking test can be provided to determine a level and acceleration at which to initialize. In still a further embodiment, initialization of level and acceleration can be set to an initial or beginner configuration (which may still have lower initialization levels for remediation with particular users who cannot master the initial or beginner configuration). In still a further embodiment, initialization can be made at the lowest proficiency level available.

At 606, a training interface (such as training interface 204) allows the trainee to practice on calls from call simulator (such as call simulator 206) at the call level, where the calls are played at the acceleration level. User inputs in response to the training interface outputs are received at 608. While the trainee is training on these calls, a metrics module (such as metrics module 210) measures the trainee's proficiency at 610. Once that proficiency meets a desired threshold, then a training module (such as training module 200) may adjust the training interface. As long as that proficiency is not yet achieved, 606-608 repeat. Once the proficiency is achieved, the next inquiry at 612 is whether the acceleration is the maximum acceleration. The maximum acceleration may depend upon the call level. For example, in an aspect, calls with a lower complexity level may be played up to 1.5× the real-time speed, while higher complexity calls may be played only as fast as 1.1× real-time speed. If the acceleration is not the max acceleration, then at 612 the acceleration is increased and the method restarts at 606. If the acceleration is the max acceleration, then at 616 the call level is increased and the acceleration is reset. Then, methodology 600 proceeds by restarting at 606. This proceeds until proficiency at the max call level (and the max acceleration at that call level) is achieved.

While FIGS. 5 and 6 are provided for purposes of explanation, various methodologies or embodiments of methodologies other than those illustrated are embraced under the disclosures herein. In an example of an alternative embodiment, a method can comprise providing a current prerecorded training call having a current call complexity to a user at a playback speed. The current prerecorded training call may be among one or more prerecorded training calls having respective call complexities. The method can also comprise receiving a motor input from a trainee based on the current prerecorded training call and analyzing the motor input from the trainee to determine a trainee motor accuracy metric. The method can further comprise comparing the trainee motor accuracy metric to an acceleration threshold and determining whether the trainee motor accuracy metric exceeds the acceleration threshold. If the motor accuracy metric exceeds the acceleration threshold, the method can also comprise comparing the playback speed to a maximum playback speed. If the playback speed is below a maximum playback speed, the method can also comprise accelerating the playback speed for a subsequent prerecorded training call of the one or more prerecorded training calls. If the playback speed meets a maximum playback speed, the method can also comprise comparing the current call complexity to a maximum call complexity. If the current call complexity is below a maximum call complexity, the method can also comprise increasing the call complexity of the subsequent prerecorded training call of the one or more prerecorded training calls. If the current call complexity meets a maximum call complexity, the method can also comprise providing a current two-way training call to the user.

In embodiments, methods herein can also comprise receiving a communication input from the trainee based on the current two-way training call and, substantially concurrent with receiving the communication input from the trainee, receiving a subsequent motor input from the trainee based on the current two-way training call. Such embodiments can also comprise analyzing the communication input from the trainee to determine a trainee communication accuracy metric and analyzing the subsequent motor input from the trainee to determine a subsequent trainee motor accuracy metric. Further embodiments may also comprise determining a composite trainee accuracy metric based on the trainee communication accuracy metric and the subsequent trainee motor accuracy metric. Further embodiments may also include receiving one or more additional composite trainee accuracy metrics and generating a group composite accuracy metric based on the composite trainee accuracy metric and the one or more additional composite trainee accuracy metrics.

In embodiments, methods herein can be performed such that the communication input is received from one or more of a microphone and a keyboard. Methods herein can also be performed, in embodiments, such that the microphone is included in one of a telephone or a computer. In embodiments herein, the motor input is received from one or more of a keyboard, a mouse, and a stylus.

Embodiments of methods herein can further comprise comparing the trainee motor accuracy metric to an acceleration floor concurrent with comparing the trainee motor accuracy metric to an acceleration threshold and determining whether the trainee motor accuracy metric is below an acceleration floor concurrent with determining whether the trainee motor accuracy metric exceeds the acceleration threshold. If the motor accuracy metric is below the acceleration floor, the method can further comprise decelerating the playback speed for the subsequent prerecorded training call of the one or more prerecorded training calls.

In further embodiments herein, methods can comprise comparing the trainee motor accuracy metric to an acceleration floor concurrent with comparing the trainee motor accuracy metric to an acceleration threshold when the playback speed is a minimum playback speed and determining whether the trainee motor accuracy metric is below an acceleration floor concurrent with determining whether the trainee motor accuracy metric exceeds the acceleration threshold and when the play speed is the minimum playback speed. If the motor accuracy metric is below the acceleration floor, embodiments of methodologies can comprise decreasing the call complexity of the subsequent prerecorded training call of the one or more prerecorded training calls.

Methodologies herein are described with specific aspects for ease of explanation with respect to various embodiments. However, methodologies embraced under the scope and spirit of the disclosure may vary, to include excluding particular aspects or comparisons described.

As those skilled in the art will appreciate, one or more aspects of the systems, or implementations of methods, described herein may comprise any combination of hardware or software, one or more operating systems (e.g., Windows, OS, UNIX, Linux, Solaris, Android, or iOS), various conventional support software, or drivers typically associated with computers. Further, one or more of the aspects shown in, e.g., FIGS. 1 and/or 2 may include any suitable telephone, personal computer, network computer, workstation, minicomputer, mainframe, tablet, mobile device, or the like. One or more of the aspects shown in, e.g., FIGS. 1 and/or 2 may employ any type of database, such as relational, hierarchical, graphical, object-oriented, or other database configurations. Common database products that may be used include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "primary key field" (hereinafter "key field"), in pre-selected databases or data sectors.

More particularly, a key field may partition a database associated with one or more of the aspects shown in, e.g., FIGS. 1 and/or 2 according to the high-level class of objects defined by the key field. For example, certain types of data may be designated as a key field in a plurality of related data tables, and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; or other proprietary techniques, which may include fractal compression methods, image compression methods, or the like.

In one example aspect, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used). By using BLOB methods, the ability to store various data sets that have different formats facilitates the storage of data associated with the system by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and second party. Each of these three example data sets may contain different information that is stored using different data storage formats or techniques. Further, each data set may contain subsets of data that also may be distinct from other subsets.

As stated above, in various aspects of one or more of the aspects shown in, e.g., FIGS. 1 and/or 2, the data can be stored without regard to a common format. However, in one example aspect of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, a transaction or membership account identifier, or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets. Furthermore, the security information may restrict/permit only certain actions such as accessing, modifying, or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one aspect, the header or trailer is not stored on the transaction device along with the associated issuer-owned data, but instead the appropriate action may be taken by providing, to the transaction instrument user at the standalone device, the appropriate option for the action to be taken. A data storage arrangement wherein the header or trailer, or header or trailer history, of the data may be stored on the transaction instrument in relation to the appropriate data. One skilled in the art will also appreciate that, for security reasons, any databases, systems, devices, servers, or other components of one or more of the aspects shown in, e.g., FIGS. 1 and/or 2 may comprise any combination thereof at a single location or at multiple locations, wherein each database or system includes any of various suitable security features, such as firewalls, access codes, encryption, decryption, compression, decompression, or the like.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A system, comprising:
a microphone for receiving sound from a trainee;
a speaker for transmitting sound to the trainee;
a keyboard for receiving motor input from the trainee;
a motor training component operatively coupled with the speaker and the keyboard, the motor training component causes playback of prerecorded training calls at a playback speed, the motor training component receives motor input from the keyboard, the motor training component analyzes the motor input from the keyboard to determine a trainee motor accuracy metric, the motor training component compares the trainee motor accuracy metric to an acceleration threshold, the motor training component accelerates the playback speed when the trainee motor accuracy metric exceeds the acceleration threshold when the playback speed is below a maximum playback speed, the motor training component increases a prerecorded training call complexity when the trainee motor accuracy metric exceeds the acceleration threshold at the maximum playback speed;
a communication training component operatively coupled with the speaker and the microphone, the communication training component causes initiation of two-way training calls when the trainee motor accuracy metric exceeds a motor training threshold and the playback speed exceeds a maximum playback speed for a maximum prerecorded call complexity, the communication training component receives communication input from the microphone, the communication training component determines a trainee communication accuracy metric based on the communication input; and
a composite training component that determines a composite trainee accuracy metric based on the trainee motor accuracy metric and the trainee communication accuracy metric.

2. The system of claim 1, further comprising a mouse or stylus for receiving the motor input from the trainee.

3. The system of claim 1, further comprising a metric aggregation component that receives one or more additional composite trainee accuracy metrics and generates a group composite accuracy metric based on the composite trainee accuracy metric and the one or more additional composite trainee accuracy metrics.

4. The system of claim 1, the motor training component further compares the trainee motor accuracy metric to an acceleration floor, the motor training component decelerates the playback speed when the trainee motor accuracy metric is below the acceleration floor.

5. The system of claim 4, the motor training component further compares the trainee motor accuracy metric to an acceleration floor when the playback speed is at a minimum playback speed and in response the motor training component decreases the call complexity.

6. The system of claim 1, the call complexity relates to a topic linearity of the call.

7. A method, comprising:
providing a current prerecorded training call having a current call complexity to a user at a playback speed, the current prerecorded training call among one or more prerecorded training calls having respective call complexities;
receiving a motor input from a trainee based on the current prerecorded training call;
analyzing the motor input from the trainee to determine a trainee motor accuracy metric;
comparing the trainee motor accuracy metric to an acceleration threshold;
determining whether the trainee motor accuracy metric exceeds the acceleration threshold;
if the motor accuracy metric exceeds the acceleration threshold, comparing the playback speed to a maximum playback speed;
if the playback speed is below a maximum playback speed, accelerating the playback speed for a subsequent prerecorded training call of the one or more prerecorded training calls;
if the playback speed meets a maximum playback speed, comparing the current call complexity to a maximum call complexity;
if the current call complexity is below a maximum call complexity, increasing the call complexity of the subsequent prerecorded training call of the one or more prerecorded training calls; and
if the current call complexity meets a maximum call complexity, providing a current two-way training call to the user.

8. The method of claim 7, further comprising:
receiving a communication input from the trainee based on the current two-way training call;
substantially concurrent with receiving the communication input from the trainee, receiving a subsequent motor input from the trainee based on the current two-way training call;
analyzing the communication input from the trainee to determine a trainee communication accuracy metric; and
analyzing the subsequent motor input from the trainee to determine a subsequent trainee motor accuracy metric.

9. The method of claim 8, further comprising:
determining a composite trainee accuracy metric based on the trainee communication accuracy metric and the subsequent trainee motor accuracy metric.

10. The method of claim 9, further comprising:
receiving one or more additional composite trainee accuracy metrics; and
generating a group composite accuracy metric based on the composite trainee accuracy metric and the one or more additional composite trainee accuracy metrics.

11. The method of claim 8, the communication input is received from one or more of a microphone and a keyboard.

12. The method of claim 11, the microphone is included in one of a telephone or a computer.

13. The method of claim 7, the motor input is received from one or more of a keyboard, a mouse, and a stylus.

14. The method of claim 7, further comprising:
comparing the trainee motor accuracy metric to an acceleration floor concurrent with comparing the trainee motor accuracy metric to an acceleration threshold;
determining whether the trainee motor accuracy metric is below an acceleration floor concurrent with determining whether the trainee motor accuracy metric exceeds the acceleration threshold; and if the motor accuracy metric is below the acceleration floor, decelerating the playback speed for the subsequent prerecorded training call of the one or more prerecorded training calls.

15. The method of claim 7, further comprising:
comparing the trainee motor accuracy metric to an acceleration floor concurrent with comparing the trainee motor accuracy metric to an acceleration threshold when the playback speed is a minimum playback speed;
determining whether the trainee motor accuracy metric is below an acceleration floor concurrent with determining whether the trainee motor accuracy metric exceeds the acceleration threshold and when the play speed is the minimum playback speed; and
if the motor accuracy metric is below the acceleration floor, decreasing the call complexity of the subsequent prerecorded training call of the one or more prerecorded training calls.

16. A system, comprising:
a motor training component that causes playback of prerecorded training calls having respective call complexities at a playback speed, the motor training component receives motor input from a trainee, the motor training component analyzes the motor input from the trainee to determine a trainee motor accuracy metric, the motor training component compares the trainee motor accuracy metric to an acceleration threshold, the motor training component accelerates the playback speed when the trainee motor accuracy metric exceeds the acceleration threshold, the motor training component increases a prerecorded training call complexity when the trainee motor accuracy metric exceeds the acceleration threshold at a maximum playback speed;

a communication training component that causes initiation of two-way training calls when the trainee motor accuracy metric exceeds a motor training threshold and the playback speed exceeds a maximum playback speed for a maximum prerecorded call complexity, the communication training component receives communication input from the trainee, the communication training component determines a trainee communication accuracy metric based on the communication input; and a composite training component that determines a composite trainee accuracy metric based on the trainee motor accuracy metric and the trainee communication accuracy metric.

17. The system of claim 16, further comprising at least one of a keyboard, a mouse, a stylus, a display, a speaker, or a microphone.

18. The system of claim 16, further comprising a metric aggregation component that receives one or more additional composite trainee accuracy metrics and generates a group composite accuracy metric based on the composite trainee accuracy metric and the one or more additional composite trainee accuracy metrics.

19. The system of claim 16, the motor training component further compares the trainee motor accuracy metric to an acceleration floor, the motor training component decelerates the playback speed when the trainee motor accuracy metric is below the acceleration floor.

20. The system of claim 16, the motor training component determines an initial trainee proficiency before causing playback of the prerecorded training calls.

* * * * *

UNITED STATES PATENT AND TRADEMARK OFFICE
CERTIFICATE OF CORRECTION

PATENT NO.        : 10,403,168 B1
APPLICATION NO.   : 15/440029
DATED             : September 3, 2019
INVENTOR(S)       : George Selix Page 1 of 1

It is certified that error appears in the above-identified patent and that said Letters Patent is hereby corrected as shown below:

On the Title Page

Item (73):
READS AS:
Assignee: United States Automobile Association

SHOULD READ AS:
Assignee: United Services Automobile Association

Signed and Sealed this
Thirty-first Day of December, 2019

Andrei Iancu
*Director of the United States Patent and Trademark Office*